(12) United States Patent
Takagi

(10) Patent No.: US 6,854,641 B1
(45) Date of Patent: Feb. 15, 2005

(54) ELECTRONIC INFORMATION MANAGEMENT SYSTEM

(75) Inventor: Shiro Takagi, Inagi (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 601 days.

(21) Appl. No.: 09/703,839

(22) Filed: Nov. 2, 2000

(51) Int. Cl.[7] .............................................. G06F 17/00
(52) U.S. Cl. ............. 235/375; 235/462.45; 235/472.01; 709/206
(58) Field of Search .................. 235/375, 383, 235/432, 454, 462.01, 462.13, 462.45, 462.46, 462.15, 470, 472.01, 472.02; 455/419; 709/203, 206, 200; 400/82; 358/1.15; 707/511

(56) References Cited

U.S. PATENT DOCUMENTS

| | | | | |
|---|---|---|---|---|
| 5,423,617 A | * | 6/1995 | Marsh et al. | 400/82 |
| 5,862,321 A | * | 1/1999 | Lamming et al. | 709/200 |
| 5,939,695 A | * | 8/1999 | Nelson | 235/383 |
| 6,068,188 A | * | 5/2000 | Knowles | 235/462.01 |
| 6,144,848 A | * | 11/2000 | Walsh et al. | 455/419 |
| 6,430,601 B1 | * | 8/2002 | Eldridge et al. | 709/206 |
| 6,452,692 B1 | * | 9/2002 | Yacoub | 358/1.15 |
| 2001/0011283 A1 | * | 8/2001 | Kato et al. | 707/511 |
| 2002/0113994 A1 | * | 8/2002 | Smith, II et al. | 358/1.15 |
| 2002/0131071 A1 | * | 9/2002 | Parry | 358/1.15 |
| 2002/0133545 A1 | * | 9/2002 | Fano et al. | 709/203 |

FOREIGN PATENT DOCUMENTS

| | | | |
|---|---|---|---|
| JP | 7-154456 | | 6/1995 |
| JP | 8-50598 | | 2/1996 |
| JP | 11-146118 | | 5/1999 |
| JP | 2001-249871 A | * | 9/2001 |
| JP | 2002-55987 A | * | 2/2002 |

* cited by examiner

*Primary Examiner*—Jared J. Fureman
(74) *Attorney, Agent, or Firm*—Foley & Lardner

(57) ABSTRACT

An electronic information management system includes a portable communication terminal having a data communication function, an electronic information server for storing electronic information including, e.g., document data or image data, and a printer. Each of the portable communication terminal, the electronic information server and the printer has a connection function to an internet. The portable communication terminal is connected to the internet through a radio relay device. Since a content of a bar code can be read by a scanner of the portable communication terminal so that electronic information data can be downloaded from the electronic information server or the electronic information can be printed based on the basis of the read information, desired electronic information data can be simply and rapidly obtained from the portable communication terminal, thereby improving usability.

4 Claims, 20 Drawing Sheets

FIG.2
STORAGE POSITION 
HANDOUT
・DATE AND HOUR: APRIL 10, 2000
・AGENDA     ・・・・・
・・・・・
ATTACHED MATERIAL 1  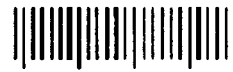
ATTACHED MATERIAL 2  

FIG.6

RELATED INFORMATION STORAGE REGION

| INPUT USER | ACCESS AUTHORITY | INPUT INFORMATION AND ANY OTHER INFORMATION | ACCESS NAME FROM OUTSIDE | ELECTRONIC INFORMATION FILE POSITION | ANY OTHER ELECTRONIC INFORMATION FILE LINK |
|---|---|---|---|---|---|
| A | A,B | FILE info 1 | http://www.acom/doc1.doc | FILE doc1.doc | FILE doc1.lik |
| B | B,A | FILE info 2 | http://www.acom/doc11.doc | FILE doc11.doc | FILE doc11.lik |
| C | C,A,B | FILE info 3 | http://www.acom/doc21.doc | FILE doc21.doc | FILE doc21.lik |
| D | D,all | FILE info 4 | http://www.acom/doc31.doc | FILE doc31.doc | FILE doc31.lik |
| E | E,all | FILE info 5 | http://www.acom/doc41.doc | FILE doc41.doc | FILE doc41.lik |

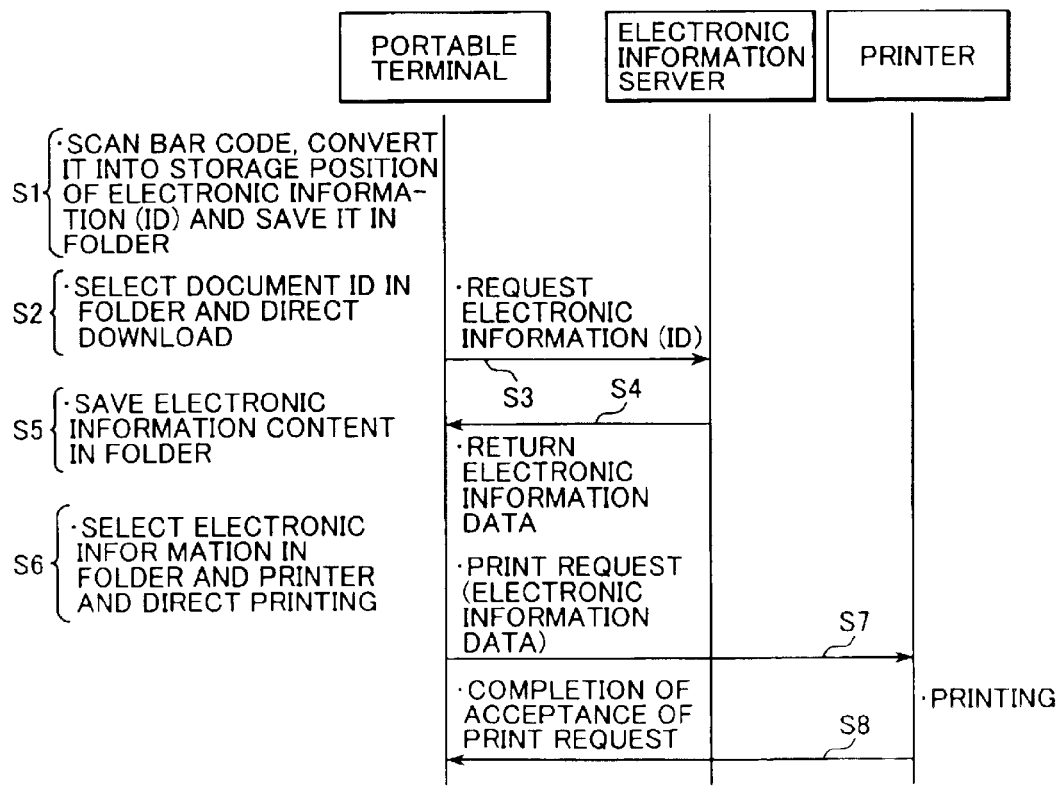

FIG.7

ELECTRONIC INFORMATION MANAGEMENT SYSTEM

BACKGROUND OF THE INVENTION

1. Field of the Invention

The present invention relates to a system for utilizing a portable communication terminal to manage a document or an image.

2. Related Background Art

With the progress of a computer and a network technique, information is often computerized and treated on the display of a computer. However, the convenience of paper is still high, and documents printed on paper are often utilized. For example, a document used in a conference is printed on paper in advance and distributed to participants of the conference. Although the participants bring back the distributed paper handout, they must read the paper handout by an image scanner to convert it into an image electronic document or perform character recognition to convert the handout into a electronic character document in order to manage this documentation on each of their own computers.

However, the material distributed in the conference is originally an electronic document created by an organizer of the conference with a word processor on the computer. If the original electronic document is available in any manner, the processing for converting from the paper material into the electronic document is unnecessary, and conversion errors during the conversion processing are not generated at all, which is very efficient.

In a conventional example, as disclosed in Japanese Patent Application Laid-Open No. 50598/1996, when printing electronic documents on paper, search information of the original electronic document is previously added to a pattern which can be recognized by a machine such as a bar code reader, and the bar code on the paper document is scan-recognized so that the original electronic document corresponding to the paper document is searched and obtained.

Furthermore, a mobile device such as a mobile phone became widely used, and therefore, it is possible to search and obtain necessary information from the mobile device. For example, Japanese Patent Application Laid-Open No. 146118/1999 discloses that necessary electronic documents can be searched from a server on a network by using a mobile device, and then printed by a printer designated on the network.

However, there has heretofore been no technique which can efficiently obtain or print necessary electronic information by combining the paper and the mobile device with convenience.

SUMMARY OF THE INVENTION

In view of the above-described problems, it is an object of the present invention to provide an electronic information management system which can print and download various kinds of electronic information with simplified procedures by utilizing a portable communication terminal.

To achieve this object, an electronic information system comprises:
- a portable communication terminal capable of transmitting/receiving data through a network;
- an electronic information server which can transmit/receive data through said network and which records a plurality of electronic information including at least one of document data and image data;
- a first printing device capable of receiving print data through said network; and
- a bar code recording medium on which a bar code for specifying a storage position of the electronic information is recorded, wherein said portable communication terminal includes:
- a scanner configured to read the bar code recorded on said bar code recording medium;
- search conditions directing means configured to transmit search conditions of electronic information to said electronic information server based on information read by said scanner;
- electronic information storing means configured to store electronic information which meets said search conditions transmitted from said electronic information server; and
- print designating means configured to transmit the electronic information stored in said electronic information storing means to said first printing device to perform printing.

In the present invention, a content of a bar code can be read by the scanner of the portable communication terminal and electronic information data can be downloaded from the electronic information server based on the read information or an electronic information service can be printed. Because of this, desired electronic information data can be readily and rapidly obtained, thereby improving the usability.

Further, the electronic information management system comprises:
- a portable communication terminal having a communication function;
- an electronic information server which can transmit/receive data through a network and which records a plurality of electronic information including at least one of document data and image data;
- a printing device capable of receiving print data through said network; and
- a bar code recording medium on which a bar code for specifying a storage position of the electronic information is recorded, wherein said portable communication terminal includes:
- information transmitting means for transmitting information read by said scanner and print designation information to said printing device,
- said printing device downloading electronic information corresponding to said information read by said scanner from said electronic information server upon receiving said print designation information from said scanner to perform printing.

In the case of printing electronic information data stored in the electronic information server, since the electronic information data is directly transmitted from the electronic information server to the print device to be printed, faster printing is enabled as compared with the case where the electronic information data is temporarily transmitted to the portable communication terminal.

Furthermore, theelectronic information management system comprises:
- a portable communication terminal having a communication function;
- an electronic information server which can transmit/received data through a network and which records a plurality of electronic information including at least one of document data and image data;
- a My electronic information server capable of downloading at least a part of the electronic information recorded in said electronic server through said network; and a bar code recording medium on which a bar code for specifying a storage position of the electronic information is recorded, said portable communication terminal includes:
a scanner for reading the bar code recorded on said bar code recording medium; and
information transmitting means for transmitting information read by said scanner and print designation information to said printing device,
said My electronic information server downloading electronic information corresponding to said information read by said scanner from said electronic information server upon receiving said print designation information from said scanner.

In the present invention, since desired data can be transmitted from the electronic information server to the My electronic information server based on designation from the portable communication terminal, electronic information data required by a user can be saved in the My electronic information server of the user him/herself with ease.

BRIEF DESCRIPTION OF THE DRAWINGS

FIG. 2 is a view showing an example of paper having a bar code printed thereon;

FIG. 6 is a view showing an example of a related information storage region;

FIG. 7 is a view showing a communication procedure of the first embodiment;

DESCRIPTION OF THE PREFERRED EMBODIMENTS

An electronic information management system according to the present invention will now be concretely described hereinafter with reference to the accompanying drawings.

First Embodiment

Figure 1:
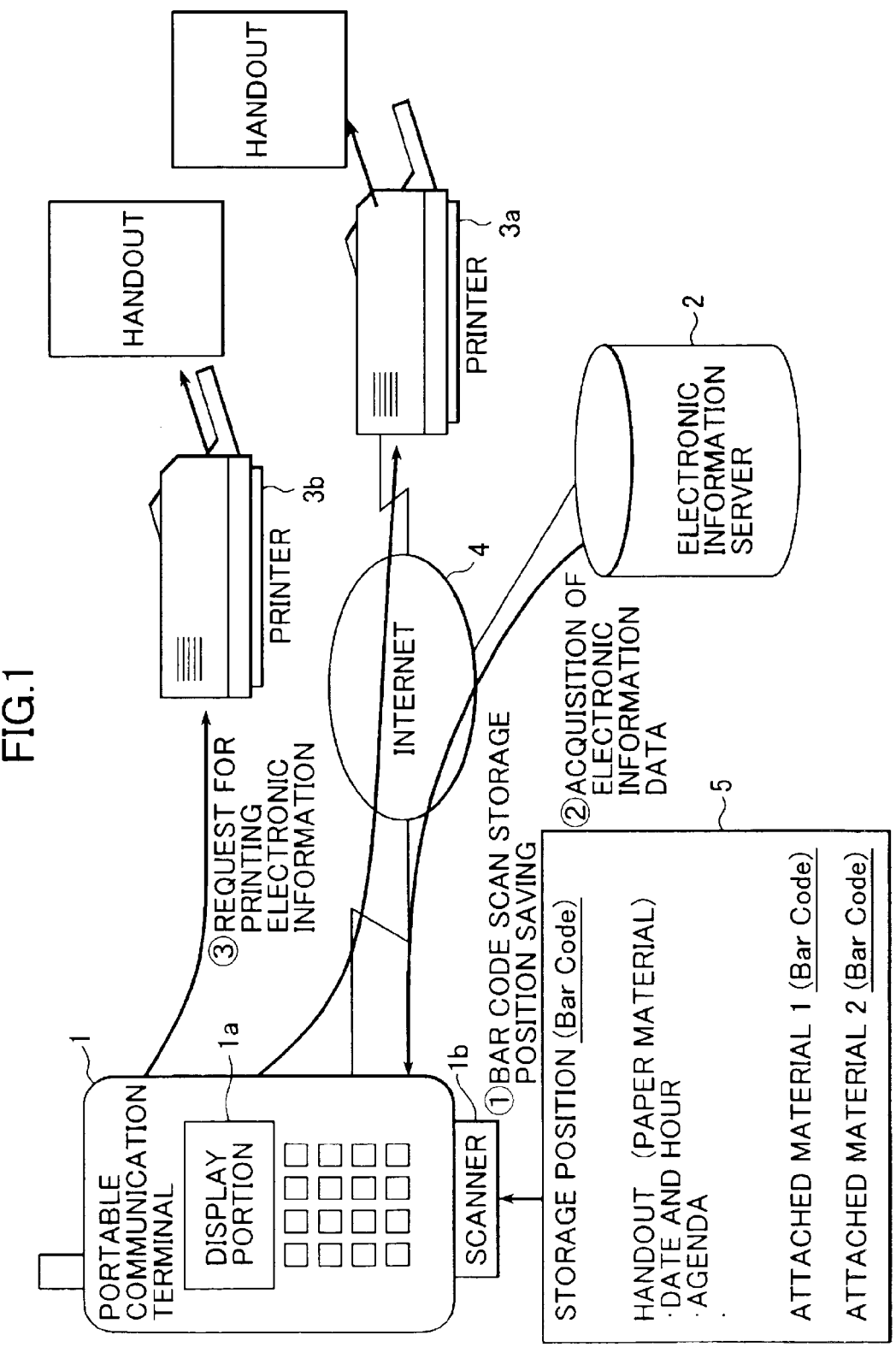
FIG. 1 is a block diagram showing a schematic structure of a first embodiment of an electronic information management system according to the present invention.

FIG. 1 is a block diagram showing a schematic structure of a first embodiment of an electronic information management system according to the present invention. The electronic information management system shown in FIG. 1 includes a portable communication terminal 1 having a data communication function, an electronic information server 2 for recording electronic information consisting of document data or image data, and printers 3a and 3b.

The portable communication terminal 1, the electronic information server 2 and the printer 3a have a connection function relative to the internet 4, respectively. The portable communication terminal 1 is connected to the internet 4 through a non-illustrated radio relay device. The portable communication terminal 1 is provided with at least one of a wide area radio communication function enabling communication in a wide area, such as a regular mobile telephone and a short range radio function enabling communication in a short range by an infrared ray and the like.

Description will now be given as to an example where a storage position of an original electronic document is printed in the form of a bar code on a paper sheet (recording medium) 5 distributed in a conference and the like. FIG. 2 is a view showing an example of this kind of paper sheet. On the upper end side of the paper sheet shown in FIG. 2 is printed the storage position (http://www.a.com/doc.doc) of the electronic document corresponding to this material on the internet 4 in the form of a bar code. Further, this material includes two types of attached materials, and bar codes for specifying these attached materials are printed on the lower end side of the material.

The printer 3b does not have a function for connecting to the internet 4 but has a radio communication function for performing radio communication with the portable communication terminal 1 so as to enable printing based on designation from the portable communication terminal 1.

Figure 3:
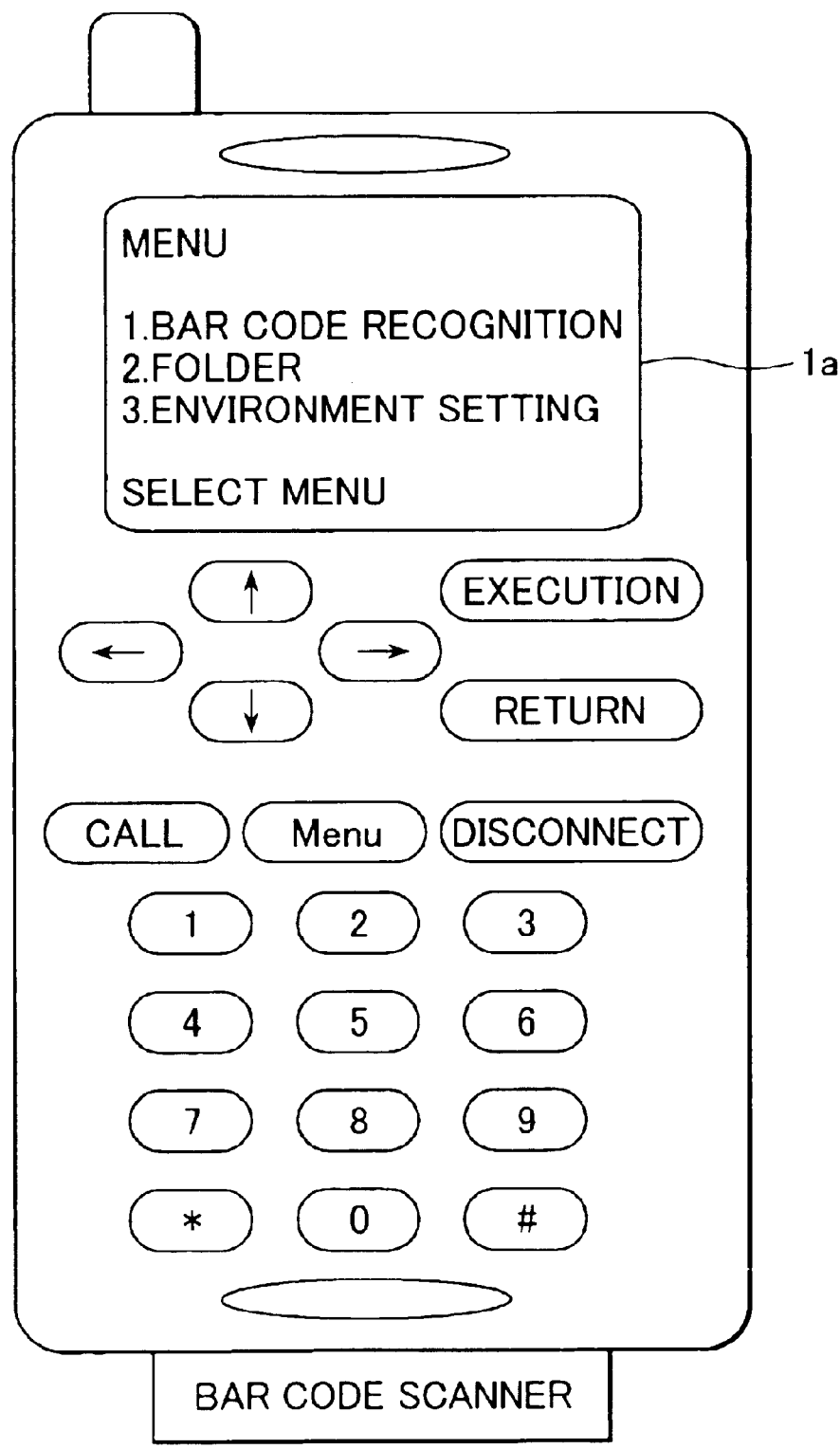
FIG. 3 is an outside drawing of a portable communication terminal.

FIG. 3 is an outline view of the portable communication terminal 1. Various menus can be displayed on a display portion 1a of the portable communication terminal 1, and a user selects a desired function or service in accordance with these menus. The scanner 1b is attached to the lower end portion of the portable communication terminal 1, and when the scanner 1b moves closer to a bar code, it reads the bar code in the non-contact manner.

Figure 4:
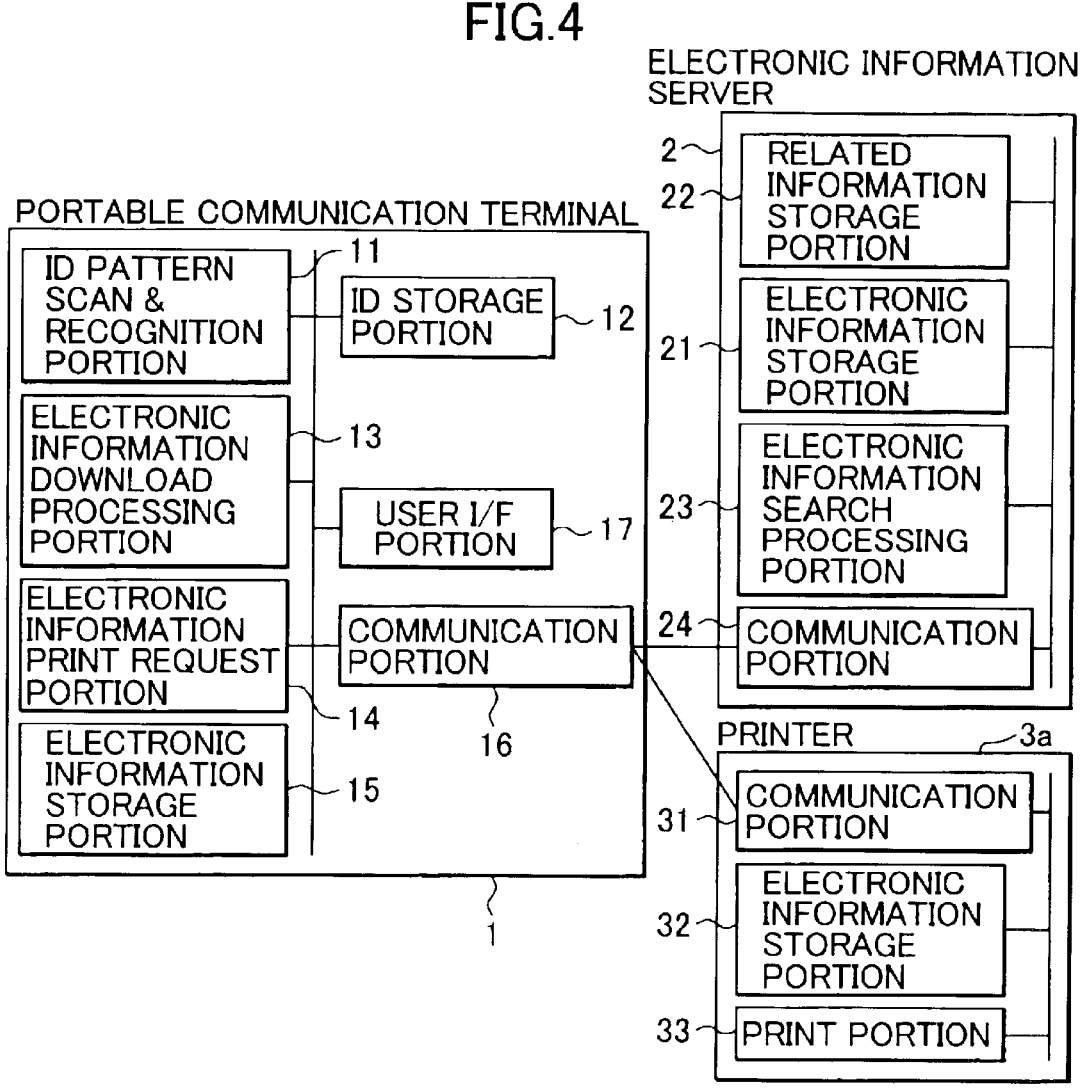
FIG. 4 is a block diagram showing an inner structure of the portable communication terminal, the electronic information server and the printer in FIG. 1.

FIG. 4 is a block diagram showing the inner structure of the portable communication terminal 1, the electronic information server 2 and the printer 3a. As shown in the drawing, the portable communication terminal 1 includes an ID pattern scan & recognition portion 11 for controlling reading of a bar code, an ID storage portion 12 for storing the read bar code, an electronic information download processing portion 13 for controlling download of electronic information, an electronic information print request portion 14 for requesting printing of electronic information, an electronic information storage portion 15 for storing the downloaded electronic information, a communication portion 16 for controlling connection to the internet 4, and a user I/F portion 17 for fetching a key inputted by a user.

The electronic information server 2 has an electronic information storage portion 21 for storing electronic information data such as document data or image data, a related information storage portion 22 for storing information relating to the electronic information data, an electronic information search processing portion 23 for searching electronic information, and a communication portion 24. The printer 3a includes a communication portion 31, an electronic information storage portion 32 for storing the electronic information from the portable communication terminal 1, and a print portion 33 for controlling printing.

Data read by the scanner 1b is mainly stored in the electronic information storage portion 21 in the electronic information server 2, but document data created by a computer or a word processor may be also stored in the electronic information storage portion 21. Further, text data obtained by carrying out OCR processing for data read by the scanner 1b to the OCR processing may be stored in the electronic information storage portion 21.

Figure 5:
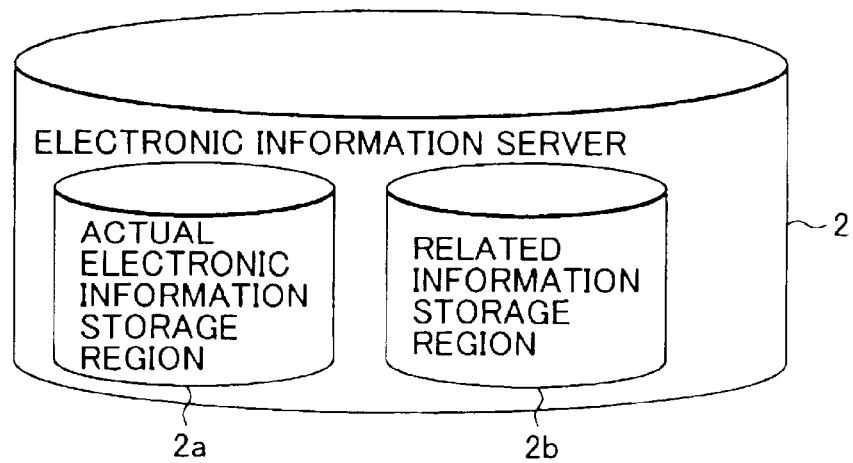
FIG. 5 is a view showing an inner structure of the electronic information server.

The electronic information server 2 has, as shown in FIG. 5, an electronic information storage region 2a for storing a data main body of the electronic information and a related information storage region 2b for storing data related to electronic information.

FIG. 6 is a view showing an example of the related information storage region 2b. The related information storage region 2b has data items such as "INPUT USER", "ACCESS AUTHORITY", "INPUT INFORMATION AND ANY OTHER INFORMATION", "ACCESS NAME FROM OUTSIDE", "ELECTRONIC INFORMATION FILE POSITION", "ANY OTHER ELECTRONIC INFORMATION FILE LINK" and others.

A name of user who inputted the electronic information is stored in "INPUT USER." A name of user who can access the electronic information is stored in "ACCESS AUTHORITY." If "all" is inputted in this column, it indicates that all members can access the information. A name of a file including information concerning the electronic information is stored in the "INPUT INFORMATION AND ANY OTHER INFORMATION." Information in case of accessing this electronic information from outside is stored in the "ACCESS NAME FROM OUTSIDE." Information indicating a storage position of a data main body of the electronic information is stored in the "ELECTRONIC INFORMATION FILE POSITION." Relevant file information such as an attached file is stored in the "ANY OTHER FILE LINK."

The electronic information server 2 bar-codes an access name from outside or a method for accessing to an attached file and uses information in the document information storage region to perform printing on the paper sheet such as shown in FIG. 2.

FIG. 7 is a view showing a communication procedure of the first embodiment. A bar code is first scanned by the scanner 1b of the portable communication terminal 1 and an ID of electronic information to be downloaded is stored (step S1). An ID of electronic information to be printed is then designated, and the electronic information download processing portion 13 is designated downloading of the information(step S2).

Subsequently, the ID is transmitted from the portable communication terminal 1 to the electronic information server 2 to request downloading (step S3). Upon receiving this request, the electronic information server 2 transmits the requested electronic information data to the portable communication terminal 1 (step S4). When the portable communication terminal 1 receives the electronic information data from the electronic information server 2, it stores this data in a folder of the electronic information storage portion 21 (step S5).

The portable communication terminal 1 then designates the electronic information to be printed and the printer 3a which indicates a printing destination (step S6) and thereafter transmits the electronic information data to the designated printer 3a (step S7). Upon completion of printing, the printer 3a transmits a signal indicating the completion of acceptance of a printing request to the portable communication terminal 1 (step S8).

Figure 8A:
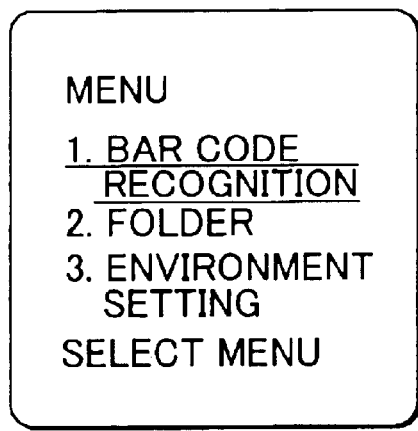
FIGS. 8A to 8C are views showing a screen display example of a display portion of the portable communication terminal.
Figure 8B:
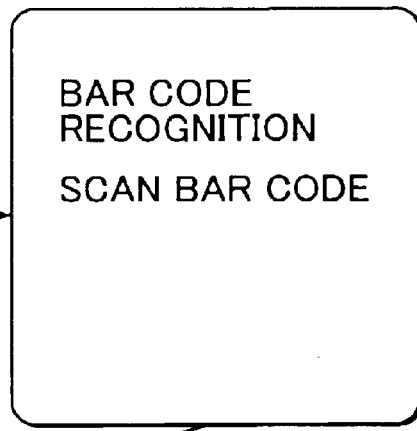
Figure 8C:

FIG. 8 is a view showing a screen display example of the display portion 1a of the portable communication terminal 1. As shown in the drawing, a menu from which any of "BAR CODE RECOGNITION", "FOLDER" and "ENVIRONMENT SETTING" can be selected is displayed. If "BAR CODE RECOGNITION" is selected in this example, a designation message such as shown in FIG. 8B is displayed. When the bar code is read by the scanner 1b in accordance with this message, a recognition result of the bar code and information indicating that an electronic information ID is stored in a folder are displayed (FIG. 8C).

Figure 9A:
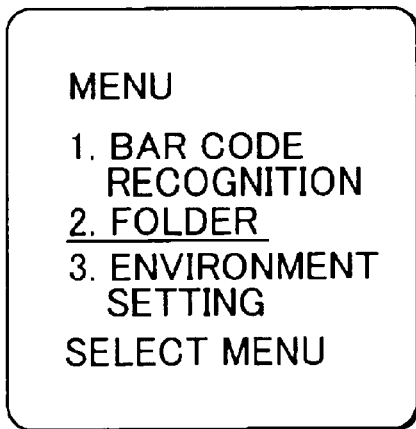
FIGS. 9A to 9E are views showing a screen display example of a display portion of the portable communication terminal.
Figure 9B:
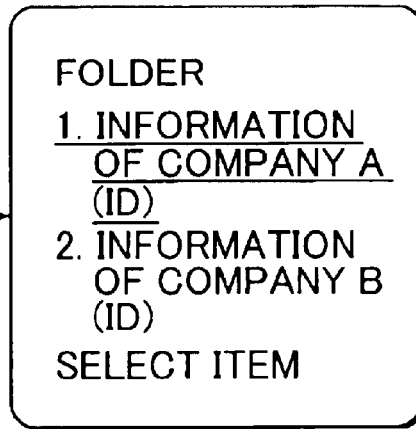
Figure 9C:
Figure 9D:
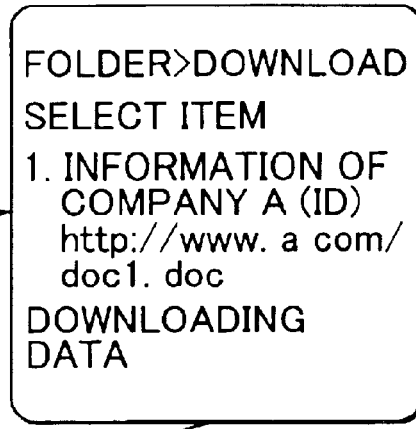
Figure 9E:
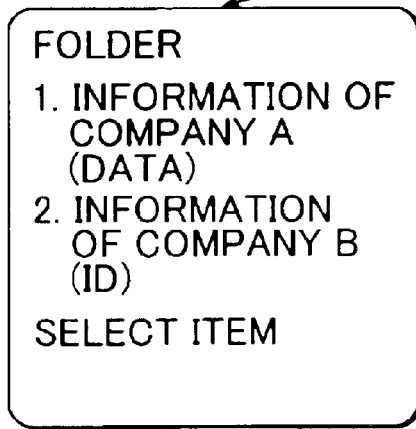

On the other hand, when "FOLDER" is selected as shown in FIG. 9A, an ID of the electronic information stored in the folder is displayed as depicted in FIG. 9B. Here, if "INFORMATION OF COMPANY A (ID)" is selected, a selection menu of "DOWNLOAD", "PRINT" and "TRANSFER TO MyServer" is displayed as shown in FIG. 9C. When "DOWNLOAD" is selected here, document data of information of the company A (ID) is downloaded from the electronic information server 2 (FIG. 9D). Upon completion of downloading, the content of the folder is displayed (FIG. 9E). As shown in FIG. 9E, since the data main body of the information of the company A has been already downloaded, it is displayed as "INFORMATION OF COMPANY A (DATA)."

Figure 10A:
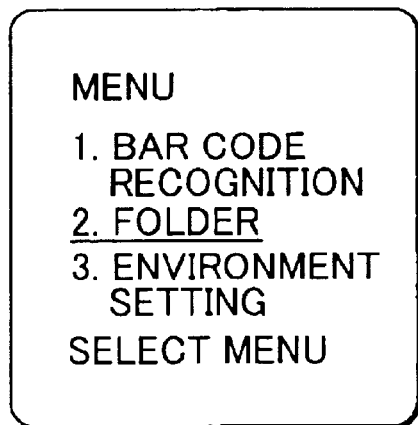
FIGS. 10A to 10F are views showing a screen display example of a display portion of the portable communication terminal.
Figure 10B:
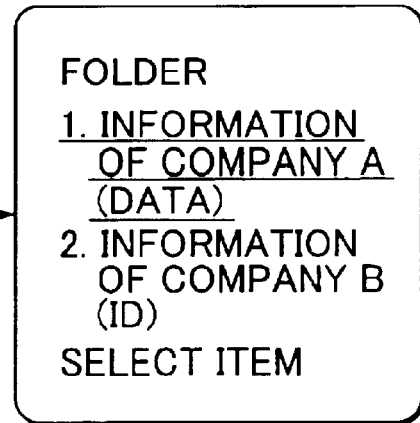
Figure 10C:
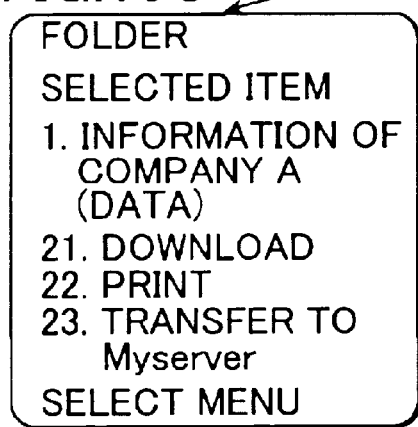
Figure 10D:
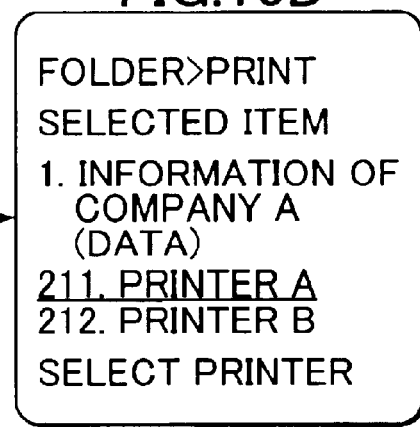

Here, as shown in FIG. 10B, when "INFORMATION OF COMPANY A (DATA)" is selected, the selection menu of "DOWNLOAD", "PRINT" and "TRANSFER TO MyServer" is displayed as shown in FIG. 10C. When "PRINT" is selected from these items, a selection menu for selecting a type of printer is displayed as shown in FIG. 10D.

Figure 10E:
Figure 10F:
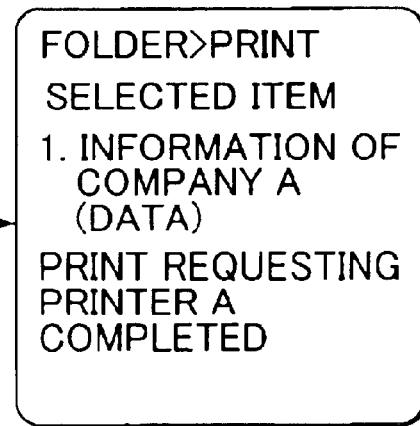

Here, when "PRINTER A" is selected, "REQUESTING PRINT TO PRINTER A" is kept being displayed until printing with the printer 3a is finished (FIG. 10E). When printing is terminated, "PRINT REQUEST TO PRINTER A COMPLETED" is displayed (FIG. 10F).

Figure 11A:
FIGS. 11A to 11F are views showing a screen display example of a display portion of the portable communication terminal.
Figure 11B:
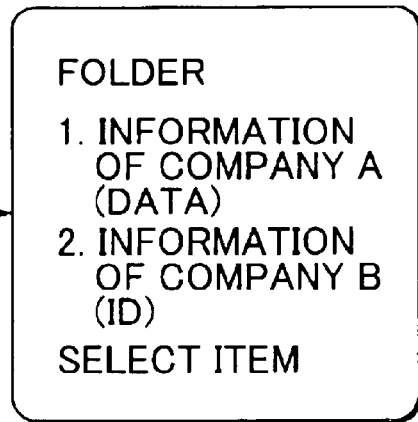
Figure 11C:
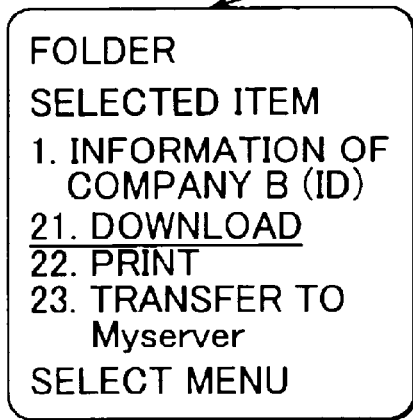
Figure 11D:
Figure 11E:
Figure 11F:

On the other hand, FIG. 11B shows an example where an ID of electronic information as a print target is designated. When "INFORMATION OF COMPANY B (ID)" is selected in FIG. 11B, a selection menu such as shown in FIG. 11C is displayed. Selecting "DOWNLOAD" allows a selection menu for selecting a type of printer to display as shown in FIG. 1D. When the printer A is selected here, a screen such as shown in FIG. 11E is kept being displayed until printing is finished. Upon completion of printing, a screen such as shown in FIG. 11F is displayed.

Figure 12:
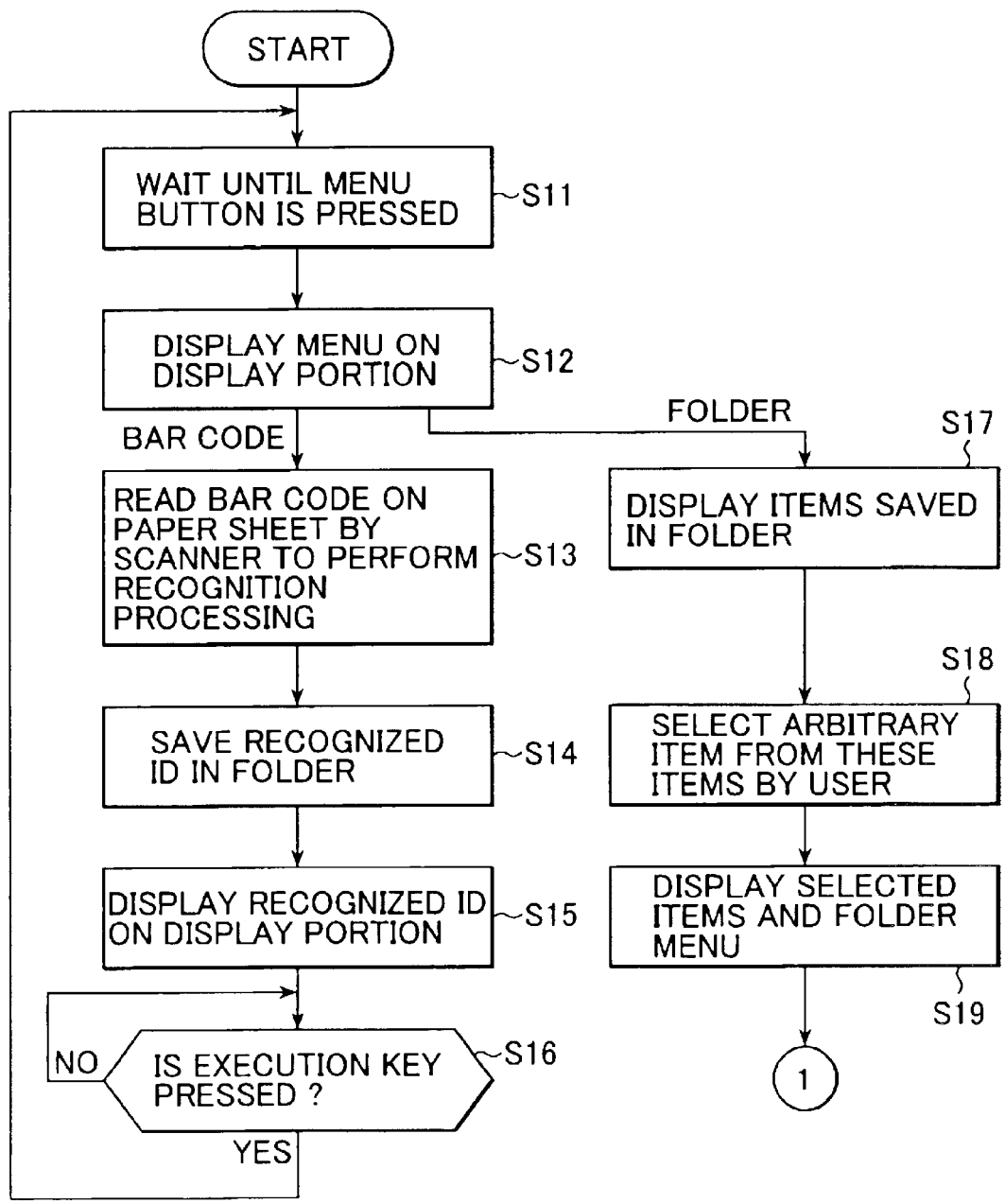
FIG. 12 is a flowchart showing a processing procedure of the portable communication terminal.
Figure 13:
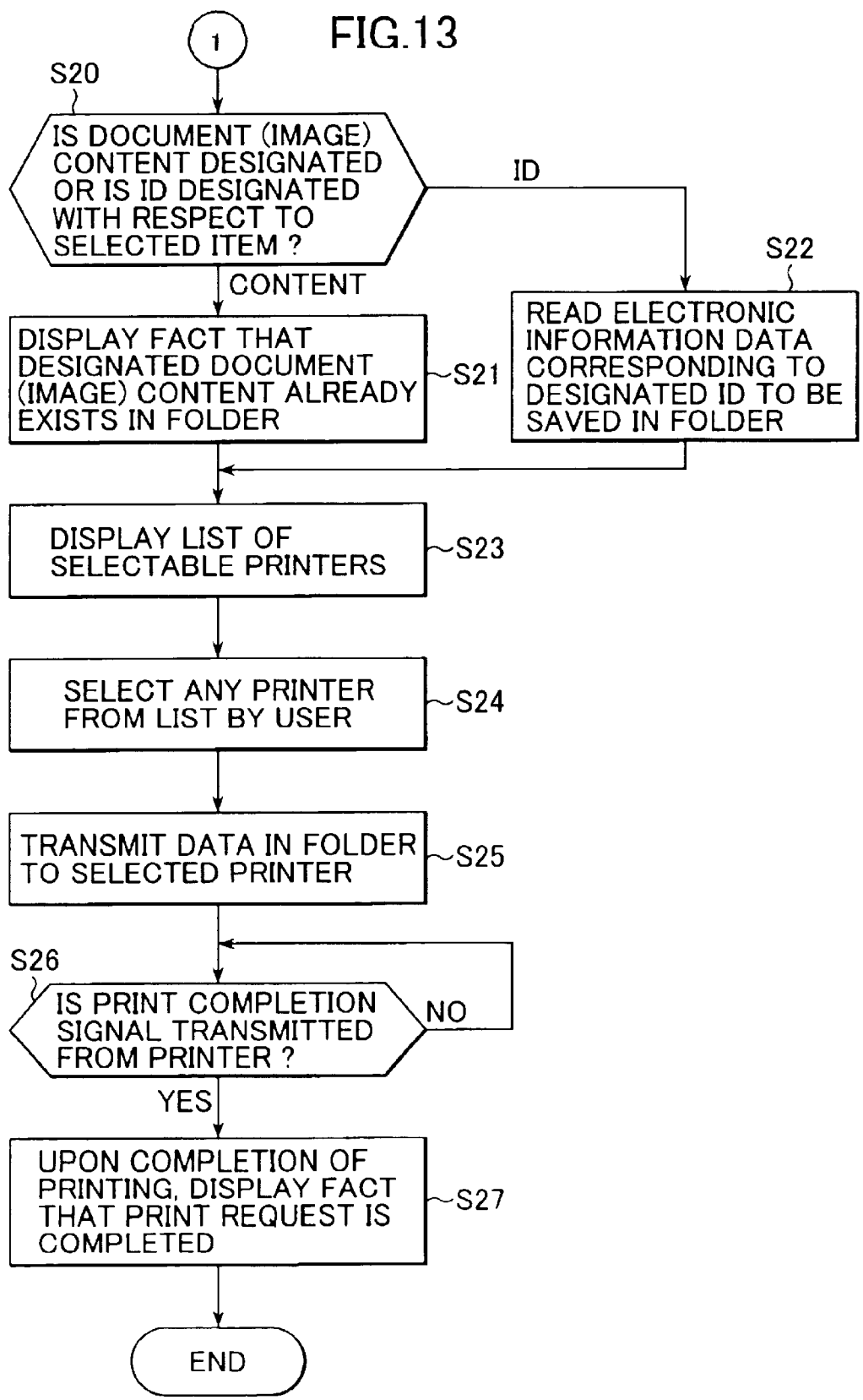
FIG. 13 is a flowchart showing a processing procedure of the portable communication terminal.

FIGS. 12 and 13 are flowcharts showing a processing procedure of the portable communication terminal 1. The standby mode continues until a menu button is pressed (step S11). When the menu button is pressed, the menu of FIG. 10A is displayed on the display portion 1a (step S12).

Here, when a user selects "BAR CODE RECOGNITION", the scanner 1b reads the bar code on the paper sheet to perform recognition (step S13). After saving the recognized electronic information ID in the folder (step S14), the recognized electronic information ID is displayed on the display unit 1a (step S15).

Subsequently, the standby mode continues until the execution key is pressed (step S16). When the execution key is pressed, the menu shown in FIG. 10A of the step S12 is again displayed.

When the user selects "FOLDER" from the menu shown in FIG. 10A, items stored in the folder are displayed (step S17). When a user selects an arbitrary item from these items (step S18), the selected item and the folder menu are displayed as shown in FIG. 10C (step S19).

When a user selects "DOWNLOAD" from this menu, a judgment is made upon whether the content of the document (image) is designated or the ID is designated with respect to the item selected in the step S18 (step S20).

When a user designates the content of the document (image), the fact that the content of the designated document (image) already exists in the folder is displayed (step S21). Further, if the ID is designated, the electronic information data corresponding to the designated ID is read from the electronic information server 2 to be stored in the folder (step S22).

Here, when the user operates the portable communication terminal 1 to designate "PRINT", a list of selectable printers is displayed (step S23). When a user selects any printer from this list (step S24), the data in the folder is transmitted to the selected printer (step S25).

Subsequently, a judgment is made upon whether a print completion signal is transmitted from the printer (step S26). If printing is completed, the fact that the print request is terminated is displayed to finish the processing (step S27).

Figure 14:
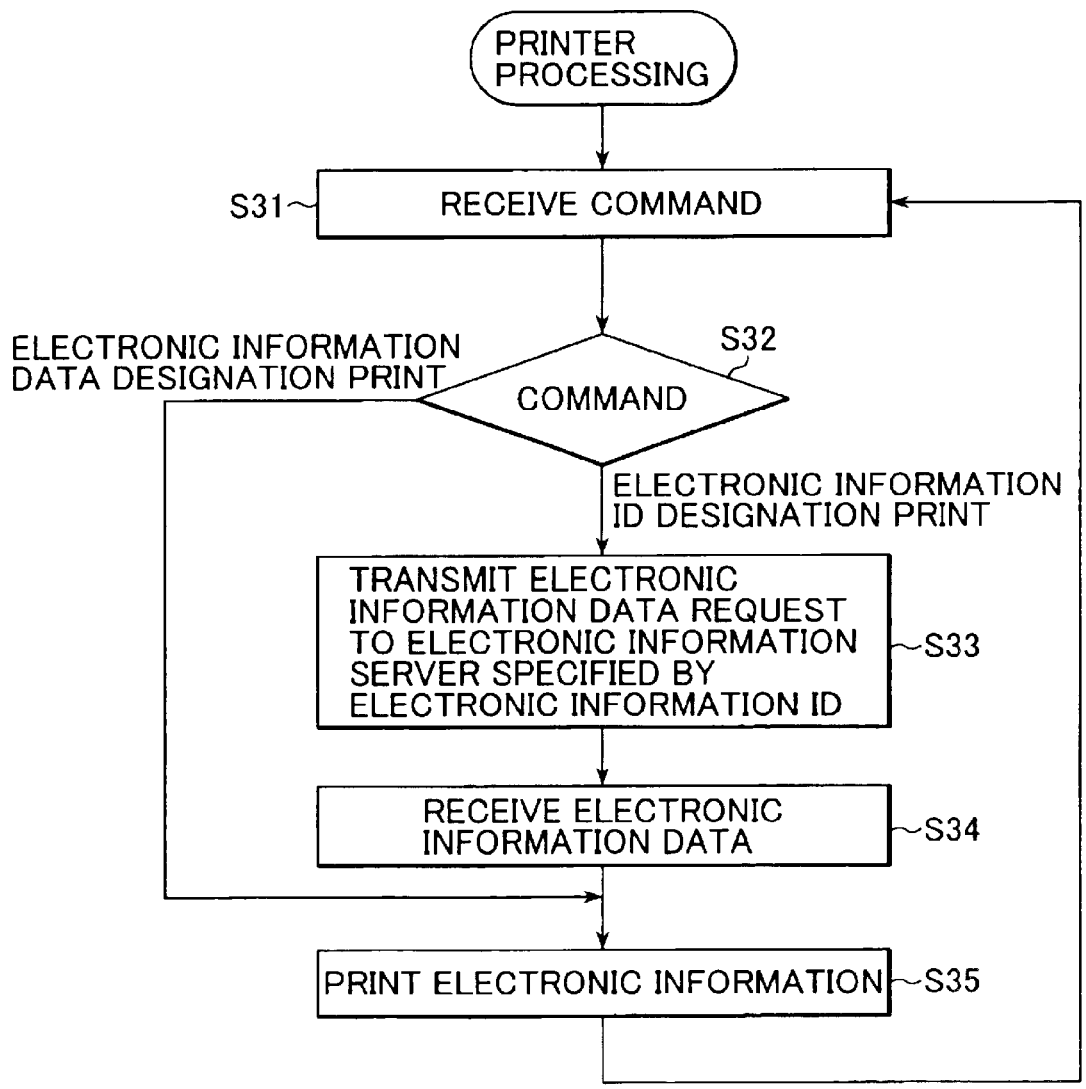
FIG. 14 is a flowchart showing a processing procedure executed by the printer.

FIG. 14 is a flowchart showing the processing procedure carried out by the printer 3a. A command from the portable communication terminal 1 is received (step S31). A judgment is then made upon whether the received command is the document (image) content designation print or the ID designation print (step S32).

If it is the ID designation print, the a request for the electronic information data is transmitted to the electronic information server 2 indicated by the ID (step S33). The electronic information data supplied from the electronic information server 2 is then received (step S34).

If it is determined that the command is the document (image) content designation print in the step S32 or if the processing of the step S34 is completed, the processing of the step S31 is carried out after printing the electronic document (step S35).

As described above, in the first embodiment, since the scanner 1b of the portable communication terminal 1 can be used to read the content of the bar code so that the electronic information data can be downloaded from the electronic information server 2 based on the read information or printing of the electronic information service can be performed, desired electronic information data can be readily and rapidly obtained even if a user who operates the portable communication terminal 1 does not have the electronic information server 2 or the printer with him/her, thereby improving the usability.

Second Embodiment

A second embodiment enables electronic information data to be directly transmitted from the electronic information server 2 to the printer 3a.

Figure 15:
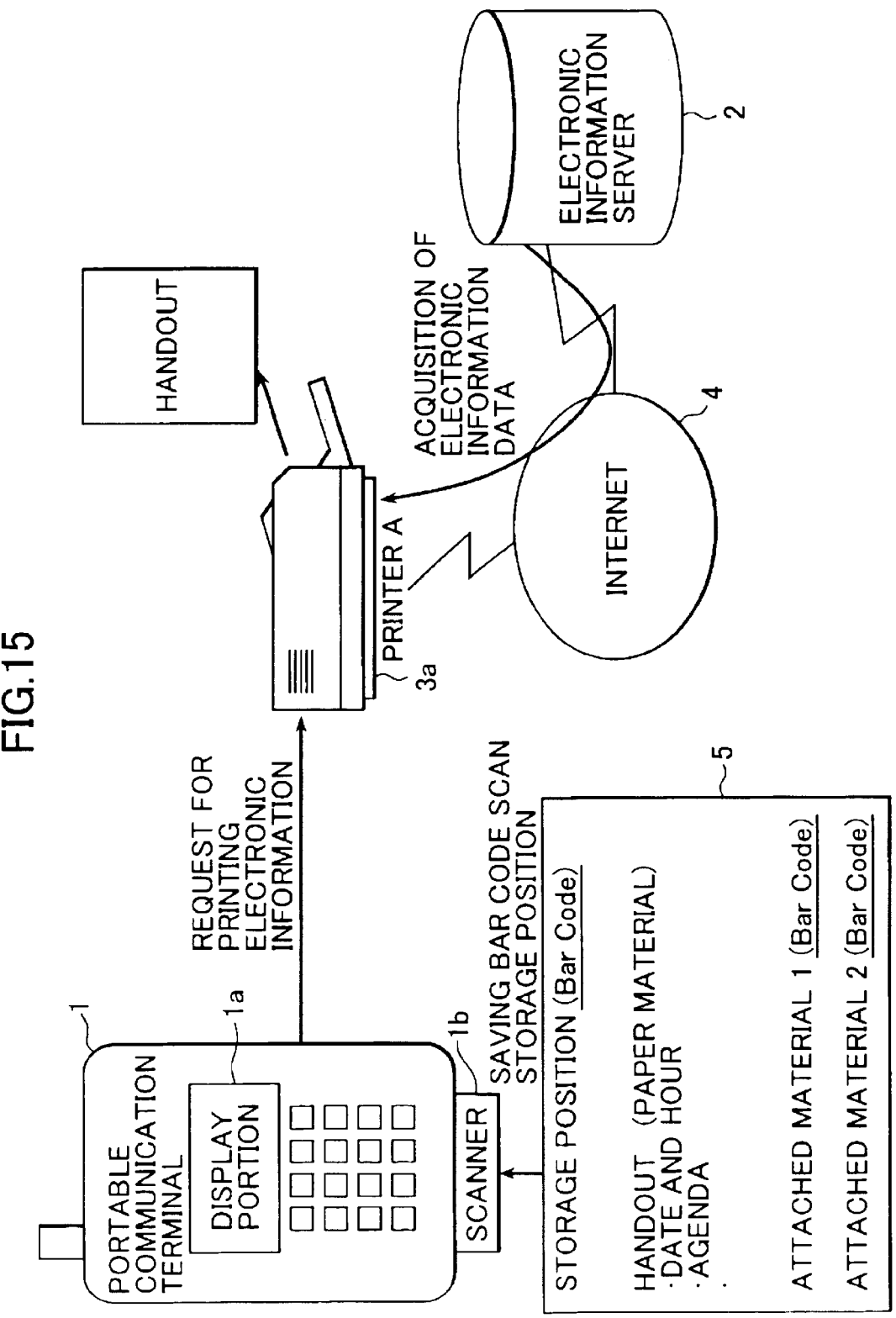
FIG. 15 is a block diagrams showing a schematic structure of a second embodiment of the electronic information management system according to the present invention.

FIG. 15 is a block diagram showing a schematic structure of the second embodiment of the electronic information management system according to the present invention. In FIG. 15, the same reference numerals are denoted to constituent parts equal to those in FIG. 1, and description will be mainly given as to differences between these embodiments.

In the electronic information management system in FIG. 15, the printer 3a and the electronic information server 2 transmit/receive data to/from each other through the internet 4, whereas the portable communication terminal 1 requests printing of electronic information directly to the printer 3a (without passing through the internet 4).

Figure 16:
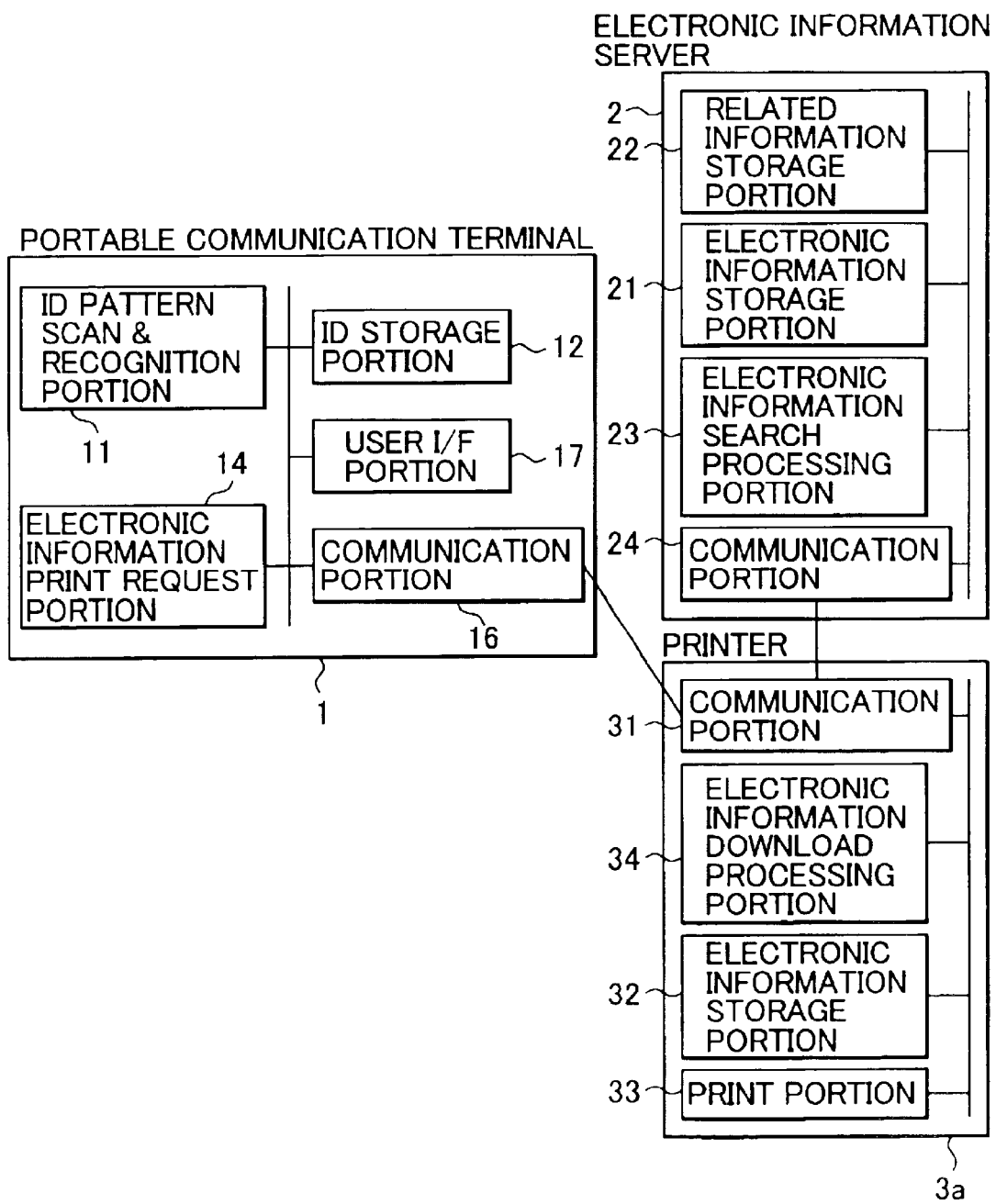
FIG. 16 is a block diagram showing an inner structure of the portable communication terminal, the electronic information server and the printer in FIG. 1.

FIG. 16 is a block diagram showing an inner structure of the portable communication terminal 1, the electronic information server 2 and the printer 3a. The portable communication terminal 1 in FIG. 16 has the structure of omitting the electronic information download processing portion 13 and the electronic information storage portion 15 from the portable communication terminal 1 in FIG. 4. Further, the printer 3a in FIG. 16 has such a structure as that the electronic information download processing portion 34 is added to the printer 3a shown in FIG. 16. It is to be noted that the electronic information server 2 has the structure equal to that depicted in FIG. 4.

Figure 17:
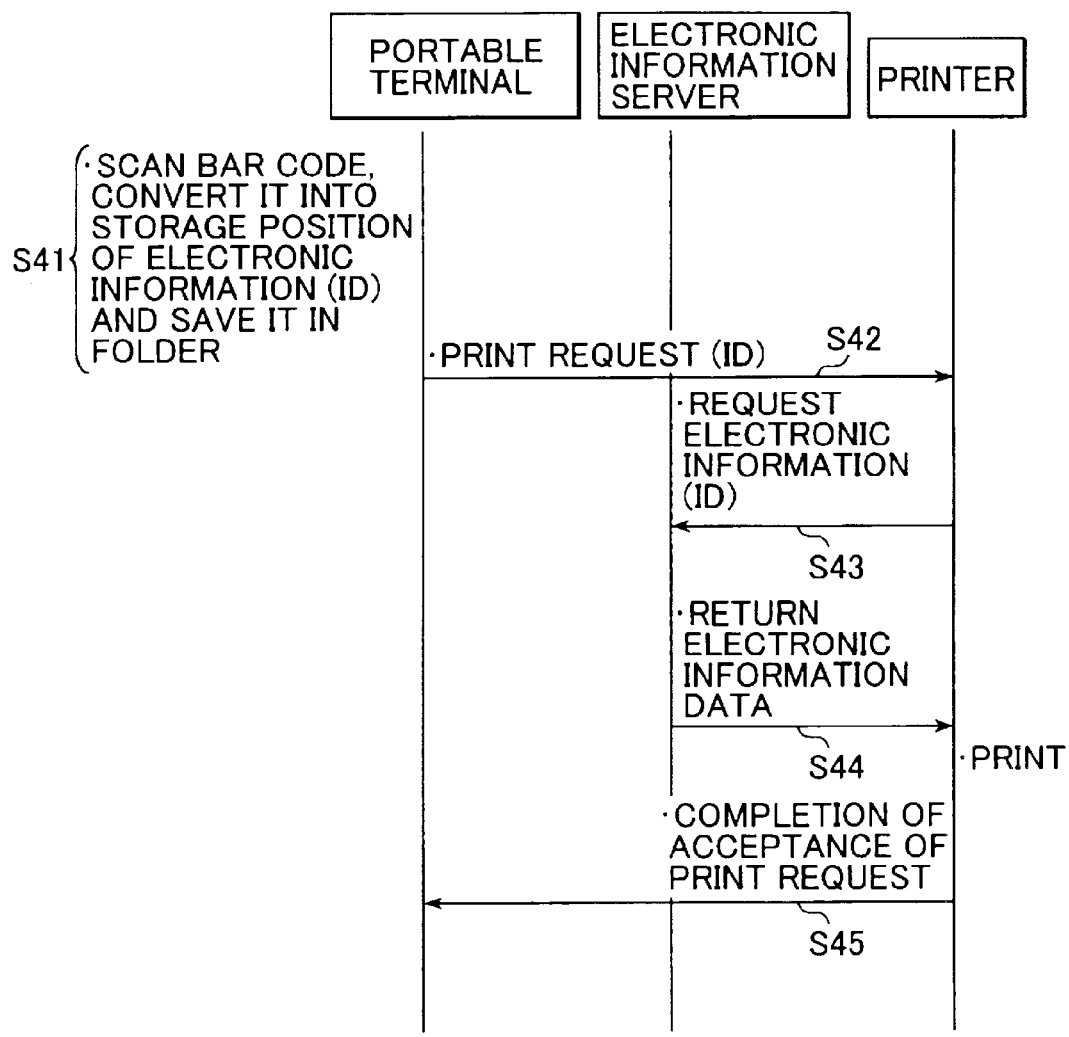
FIG. 17 is a view showing a communication procedure of the second embodiment.

FIG. 17 is a view showing the communication procedure of the second embodiment. The scanner 1b of the portable communication terminal 1 first scans a bar code and an ID of the electronic information to be printed is saved in the folder (step S41).

The printer 3a is then selected, and the selected printer 3a is requested to perform printing (step S42). At this time, the ID of the electronic information as a printing target is sent to the printer 3a.

The printer 3a then requests the electronic information server 2 to transmit the electronic information data by designating the ID (step S43). Upon receiving this request, the electronic information server 2 returns the electronic information data to the printer 3a (step S44).

Upon completing printing in the printer 3a, the printer 3a informs the portable communication terminal 1 of completion of acceptance of the print request (step S45).

As described above, in the second embodiment, since the electronic information data is directly transmitted from the electronic information server 2 to the printer 3a to be printed in case of printing the electronic information data stored in the electronic information server 2, it is possible to perform printing at higher speed as compared with the first embodiment in which the electronic information data is temporarily transmitted to the portable communication terminal 1. Further, the structure of the portable communication terminal 1 can be simplified, and the cost of the terminal can be thereby reduced.

Third Embodiment

Figure 18:
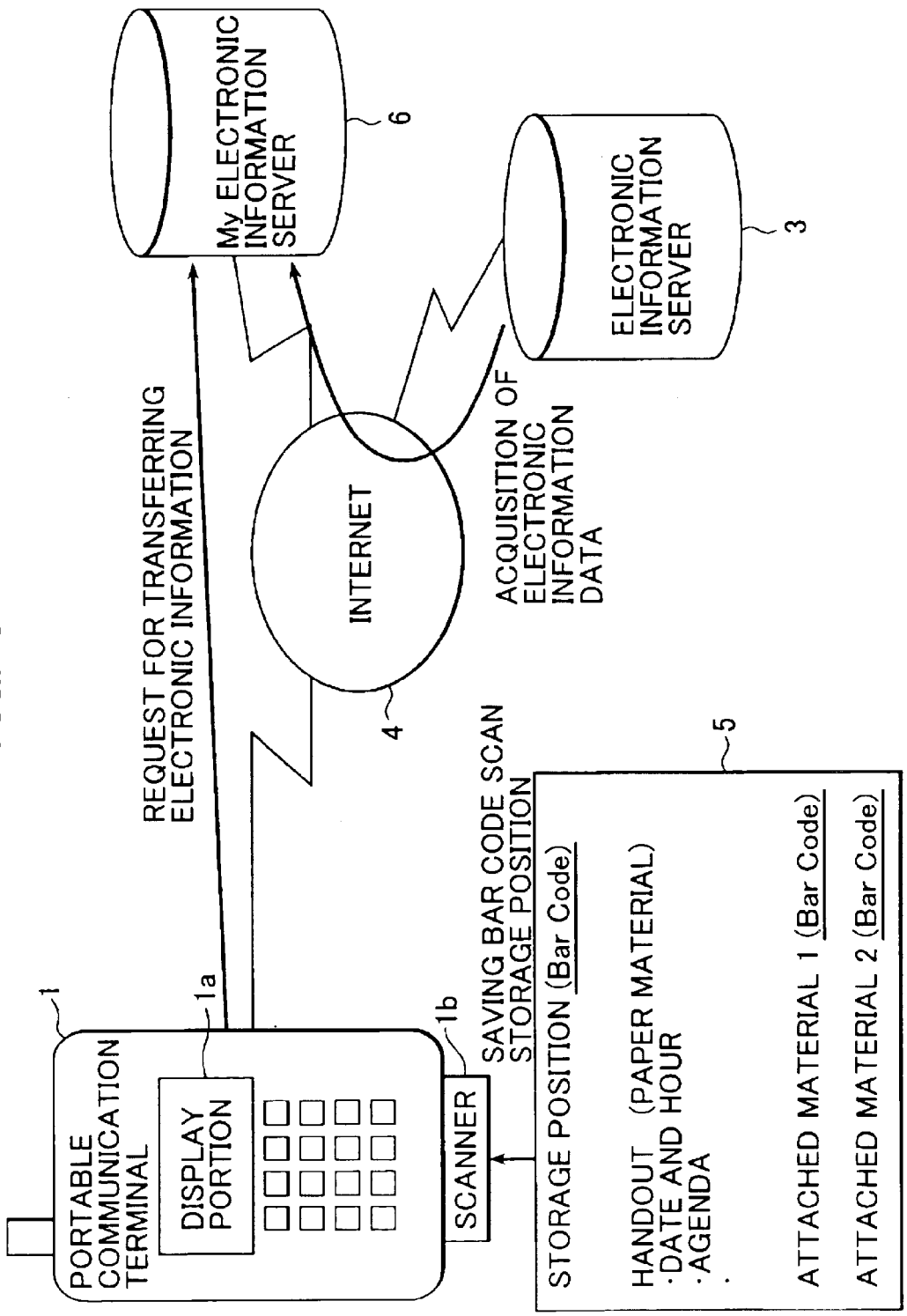
FIG. 18 is a block diagram showing a schematic structure of a third embodiment of the electronic information management system according to the present invention.

The third embodiment has a My electronic information server 6 for downloading and saving a part of the electronic information data stored in the electronic information server 2. FIG. 18 is a block diagram showing a schematic structure of the third embodiment of the electronic information management system according to the present invention. In FIG. 18, the same reference numerals are denoted to constituent parts common to those in FIG. 1, and the following mainly describes differences between these embodiments.

The electronic information management system in FIG. 18 has a My electronic information server 6 instead of the printer 3a. The My electronic information server 6 can store at least a part of the electronic information data stored in the electronic information server 2.

Figure 19:
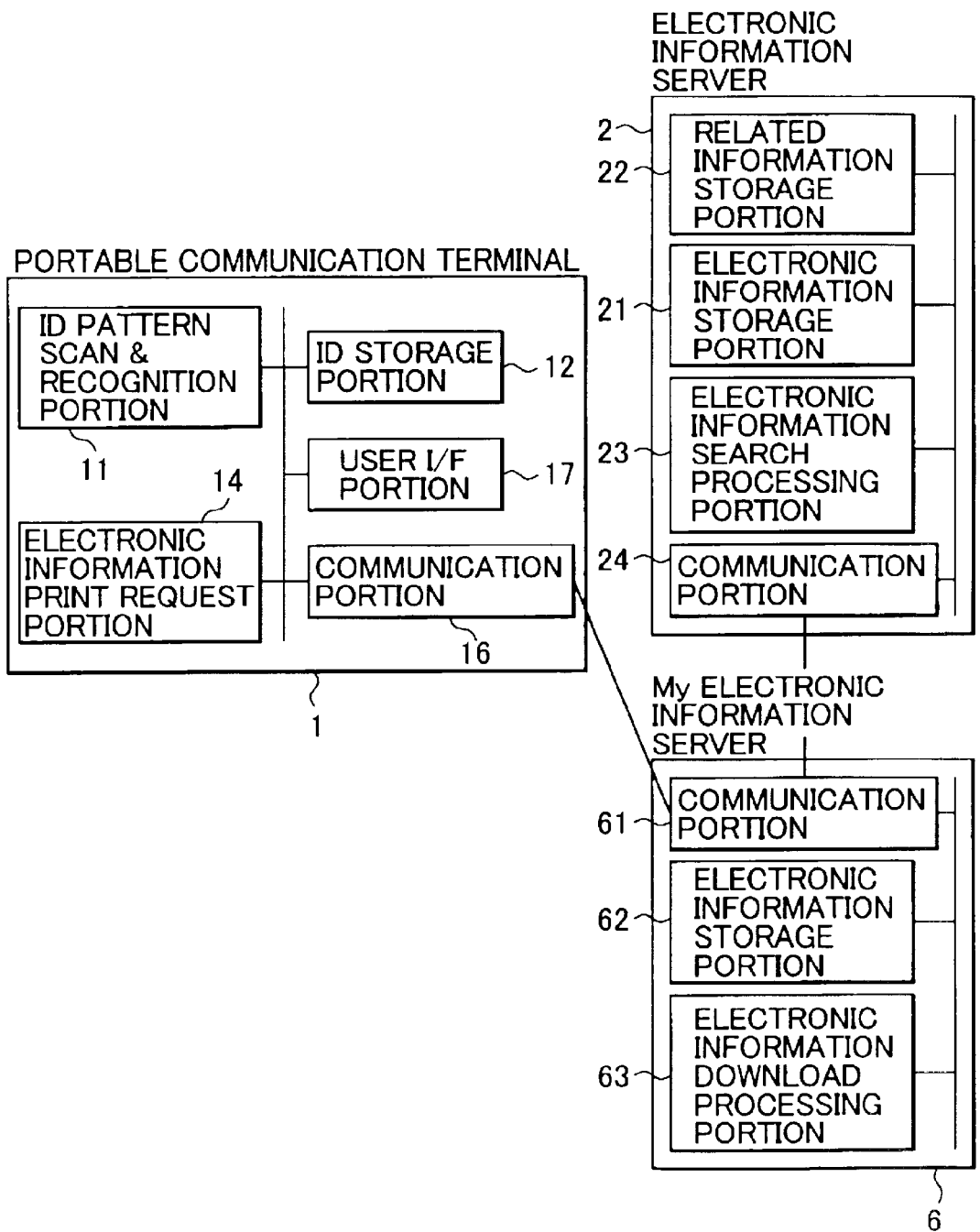
FIG. 19 is a block diagram showing an inner structure of the portable communication terminal, the electronic information server and the printer in FIG. 18.

FIG. 19 is a block diagram showing an inner structure of the portable communication terminal 1, the electronic information server 2 and the printer 3a in FIG. 18. The portable communication terminal 1 and the electronic information server 2 in FIG. 19 have the structure equal to that in the second embodiment. The My electronic information server 6 in FIG. 19 includes a communication portion 61 having a connection function relative to the internet 4, an electronic information storage portion 62 for storing the electronic information data, and an electronic information download processing portion 63 for controlling downloading from the electronic information server 2.

Figure 20:
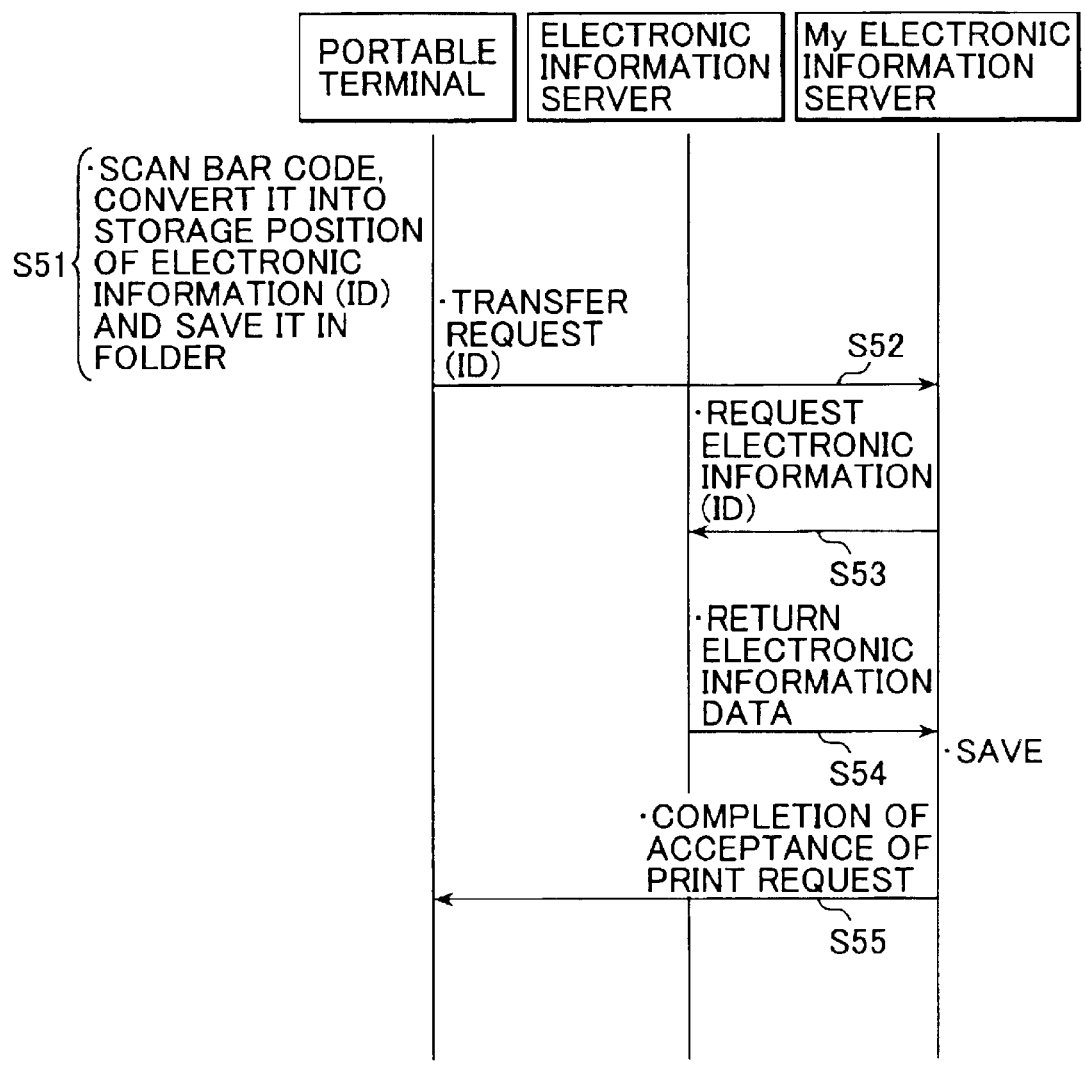
FIG. 20 is a view showing a communication procedure of the third embodiment.

FIG. 20 is a view showing a communication procedure of the third embodiment. A bar code is first scanned by the scanner 1b of the portable communication terminal 1, and an ID of the electronic information to be printed is saved in the folder (step S51).

Any one of IDs in the folder is then selected, and the portable communication terminal 1 requires to the My electronic information server 6 transmission of the electronic information data by designating the ID (step S52). The My electronic information server 6 then requests the electronic information server 2 to transmit the electronic information data by designating the ID (step S53). Upon receiving this request, the electronic information server 2 returns the electronic information data to the My electronic information server 6, and the My electronic information server 6 stores this data in a predetermined folder (step S54).

Upon completion of saving the electronic information data, the My electronic information server 6 informs the portable communication terminal 1 of termination of acceptance of the print request (step S55).

FIG. 21 is a view showing a screen display example of the display portion 1a of the portable communication terminal 1. As shown in the drawing, the menu for selecting any one of "BAR CODE RECOGNITION", "FOLDER" and "ENVIRONMENT SETTING" is displayed. Here, if "FOLDER" is selected, the content of the folder is displayed as shown in FIG. 21B. If "INFORMATION OF COMPANY B (ID)" is selected, the selection menu such as shown in FIG. 21C is displayed.

Figure 21A:
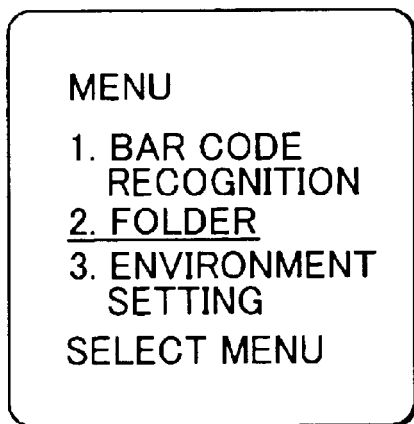
FIGS. 21A to 21E are views showing a screen display example of a display portion of the portable communication terminal.
Figure 21B:
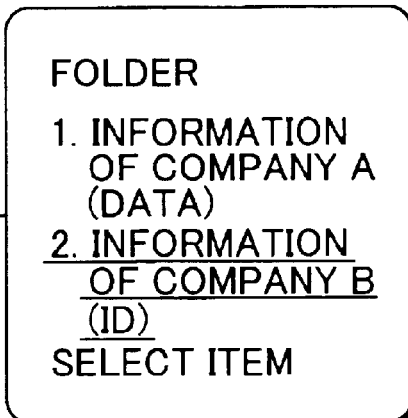
Figure 21C:
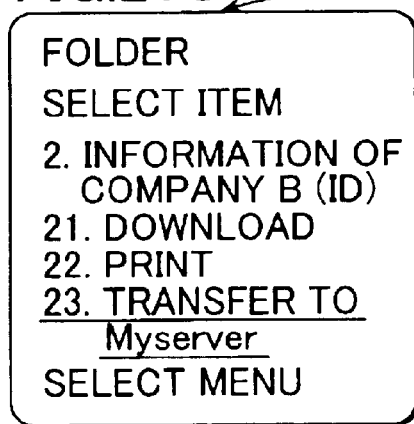
Figure 21D:
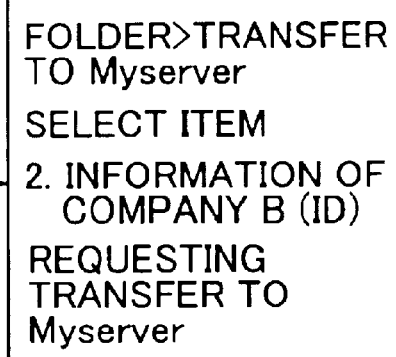
Figure 21E:
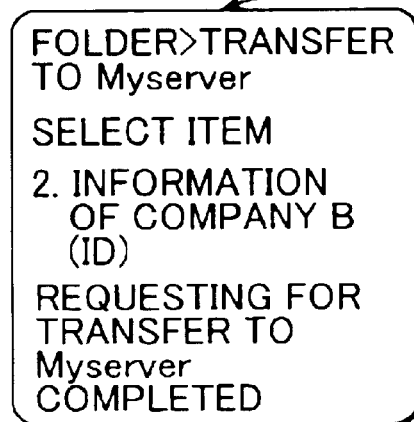

When "MyServer" is selected from this selection menu, the operation for transferring the electronic information data selected from the electronic information server 2 to the My electronic information server 6 is started, and a screen such as shown in FIG. 21D is displayed until that operation is completed. When transfer is terminated, a screen indicating the completion of the transfer request is displayed as shown in FIG. 21E.

Figure 22:
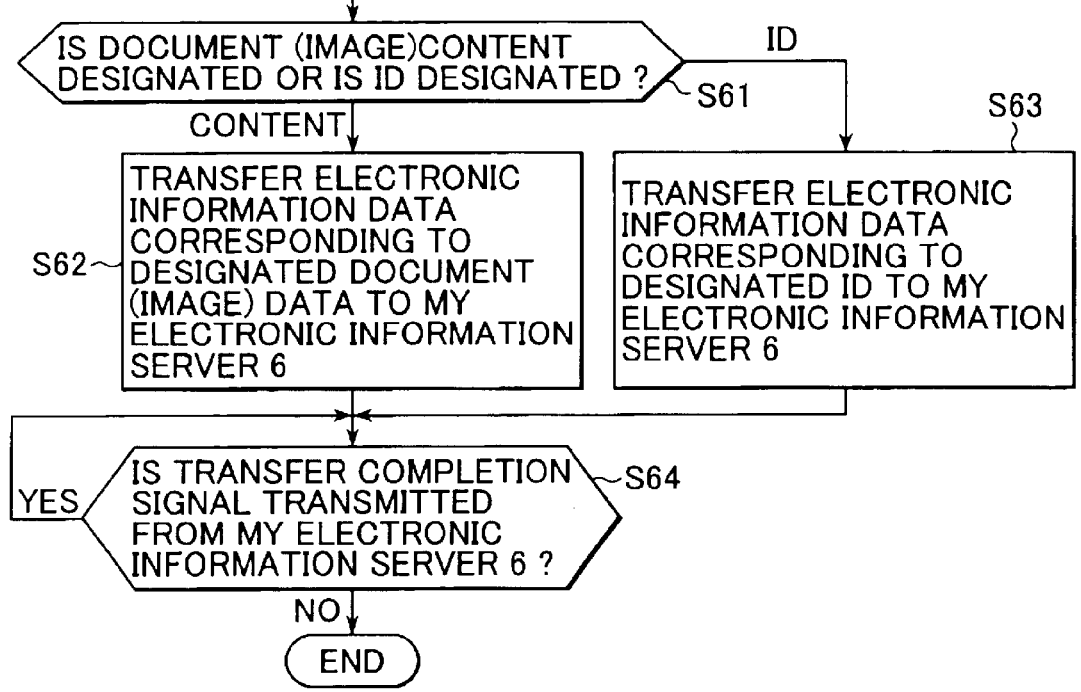
FIG. 22 is a flowchart showing a processing procedure of the portable communication terminal.

FIG. 22 is a flowchart showing the processing procedure of the portable communication terminal 1. The portable communication terminal 1 of this embodiment performs the processing in the case where "MyServer" is selected in the step S2 in FIG. 12 in addition to the processing depicted in FIGS. 12 and 13. Description will now be given as to the processing when "MyServer" is selected.

When a user selects "MyServer" from the menu displayed in the step S9, designation of the document (image) content or designation of the ID is selected with respect to the item selected in the step S8 (step S61).

When designation of the document (image) content is selected, the electronic information data corresponding to the designated document (image) content is transmitted to the My electronic information server 6 (step S62). Meanwhile, when the ID is designated, the electronic information data corresponding to the designated ID is transmitted to the My electronic information server 6 (step S63).

A judgment is then made upon whether a transfer completion signal has been transmitted from the My electronic information server 6 (step S64). If the transfer completion signal has been transmitted, the processing is terminated.

Figure 23:
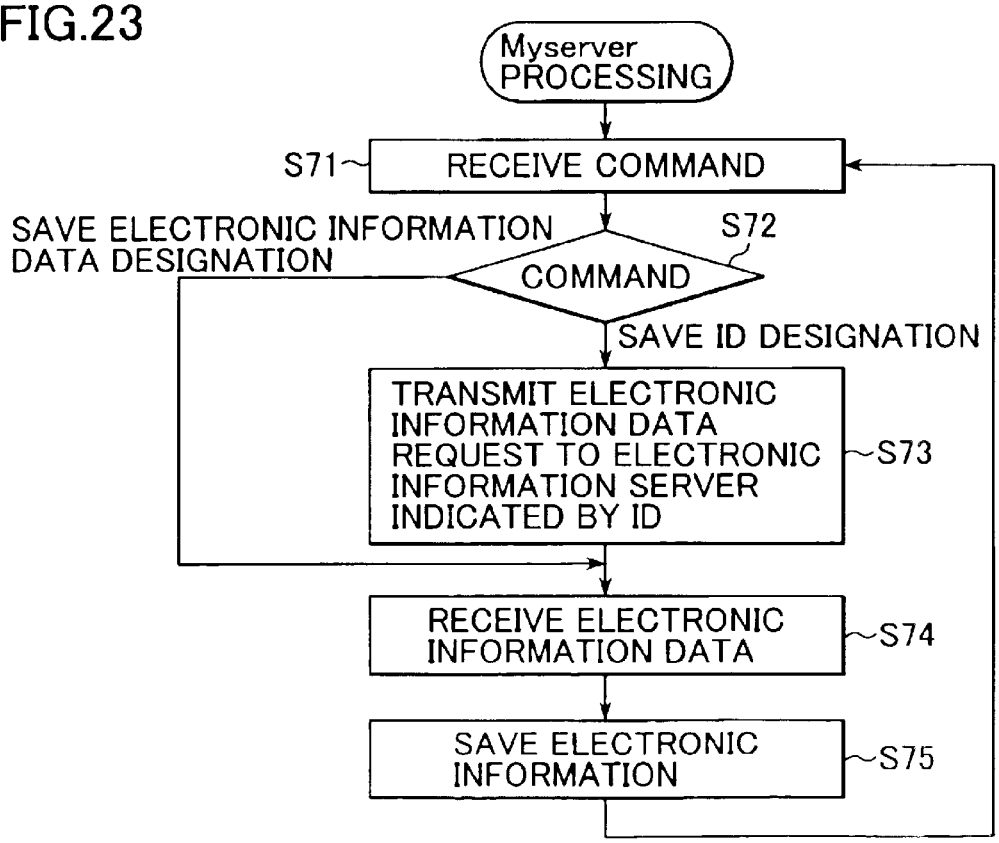
FIG. 23 is a flowchart showing a processing procedure of a My electronic information server.

FIG. 23 is a flowchart showing the processing procedure of the My electronic information server 6. A command from the portable communication terminal 1 is first received (step S71). A judgment is then made upon whether the received command is the document (image) content designation print or the ID designation print (step S72).

If it is the ID designation print, a request for the electronic information data is transmitted to the electronic information server 2 specified by the ID (step S73). The electronic information data sent from the electronic information server 2 is then received (step S74).

If it is determined that the command is the document (image) content designation print in the step S72 or if the processing in the step S74 is completed, control returns to the step S71 after saving the electronic information (step S75).

As described above, in the third embodiment, since desired data can be transmitted from the electronic information server 2 to the My electronic information server 6 in accordance with an instruction from the portable communication terminal 1, the electronic information data required by a user can be easily saved in the My electronic information server 6 of the user.

What is claimed is:

1. An electronic information management system comprising:
   a portable communication terminal capable of transmitting/receiving data through a network;
   an electronic information server which can transmit/receive data through said network and which records a plurality of electronic information including at least either document data or image data; and
   a first printing device capable of receiving print data through said network,
   wherein said portable communication terminal includes:
   search conditions directing means configured to transmit search conditions of electronic information to said electronic information server;
   electronic information storing means configured to store electronic information which meets said search conditions transmitted from said electronic information server;
   print designating means configured to transmit the electronic information stored in said electronic information storing means to said first printing device to perform printing;
   displaying means capable of displaying character information;

menu display controlling means configured to display a menu for selecting various kinds of functions on said displaying means;

key inputting means configured to select the functions in accordance with said menu;

data type display controlling means configured to display, on said displaying means, first information indicating that a data main body of the electronic information is stored in said portable communication terminal, and second information indicating that said data main body of the electronic information is not stored in said portable communication terminal but information representing a storage position of said electronic information is stored in said portable communication terminal; and print information selecting means configured to select electronic information which can be a target to be printed by said printing device from the information displayed on said displaying means by said data type display controlling means.

2. The electronic information management system according to claim 1, further comprising:

a bar code recording medium on which a bar code for specifying a storage position of the electronic information is recorded, wherein said portable communication terminal includes:
a scanner configured to read the bar code recorded on said bar code recording medium.

3. An electronic information management system comprising:

a portable communication terminal capable of transmitting/receiving data through a network;

an electronic information server which can transmit/receive data through said network and which records a plurality of electronic information including at least either document data or image data; and a first printing device capable of receiving print data through said network, wherein said portable communication terminal includes:
search conditions directing means configured to transmit search conditions of electronic information to said electronic information server;

electronic information storing means configured to store electronic information which meets said search conditions transmitted from said electronic information server;

print designating means configured to transmit the electronic information stored in said electronic information storing means to said first printing device to perform printing;

displaying means capable of displaying character information;

menu display controlling means configured to display a menu for selecting various kinds of functions on said displaying means;

key inputting means configured to select the functions in accordance with said menu;

data type display controlling means configured to display, on said displaying means, first information indicating that a data main body of the electronic information is stored in said portable communication terminal, and second information indicating that said data main body of the electronic information is not stored in said portable communication terminal but information representing a storage position of said electronic information is stored in said portable communication terminal; and print information selecting means configured to select electronic information which can be a target to be printed by said printing device from the information displayed on said displaying means by said data type display controlling means, wherein when said second information is selected by said print information selecting means, said print designating means downloads the corresponding electronic information from said electronic information server into said portable communication terminal, and then transmits said downloaded electronic information to said printing device.

4. The electronic information management system according to claim 3, further comprising:

a bar code recording medium on which a bar code for specifying a storage position of the electronic information is recorded, wherein said portable communication terminal includes:
a scanner configured to read the bar code recorded on said bar code recording medium.

* * * * *